United States Patent [19]

Ohara et al.

[11] Patent Number: 5,377,228
[45] Date of Patent: Dec. 27, 1994

[54] DATA REPEATING APPARATUS

[75] Inventors: Kazuhiro Ohara; Kazushi Tamai, both of Hamamatsu, Japan

[73] Assignee: Yamaha Corporation, Hamamatsu, Japan

[21] Appl. No.: 49,527

[22] Filed: Apr. 20, 1993

[30] Foreign Application Priority Data

Apr. 20, 1992 [JP] Japan .................................. 4-126893
Apr. 20, 1992 [JP] Japan .................................. 4-126894
Apr. 20, 1992 [JP] Japan .................................. 4-126895

[51] Int. Cl.$^5$ ........................... H04J 3/07; H04B 3/36
[52] U.S. Cl. ..................................... 375/3; 375/118; 370/105
[58] Field of Search ................. 375/3, 3.1, 4, 107, 375/108, 118; 370/75, 97, 85.5, 102, 105, 105.1; 379/343

[56] References Cited

U.S. PATENT DOCUMENTS

| | | |
|---|---|---|
| Re. 31,852 | 3/1985 | Soderblom . |
| 4,596,026 | 6/1986 | Cease et al. ........................ 370/102 |
| 4,674,086 | 6/1987 | Szczepanek et al. ............. 370/85.5 |
| 4,884,268 | 11/1989 | Goto ................................... 370/102 |
| 5,113,395 | 5/1992 | Murakami et al. ................ 370/102 |
| 5,289,390 | 2/1994 | Unverrich .......................... 370/85.5 |

FOREIGN PATENT DOCUMENTS

| | | |
|---|---|---|
| 56-4077 | 1/1981 | Japan . |
| 6473946 | 3/1989 | Japan . |
| 37172 | 1/1991 | Japan . |
| 330541 | 2/1991 | Japan . |
| 320181 | 3/1991 | Japan . |

*Primary Examiner*—Stephen Chin
*Assistant Examiner*—Timothy J. May
*Attorney, Agent, or Firm*—Spensley Horn Jubas & Lubitz

[57] ABSTRACT

In a communication network system such as a local area network (i.e., LAN), a plurality of repeating stations each providing a data repeating apparatus are linked together by a transmission line, wherein serial data of which significant data portion is sandwiched by delimiters is transferred. This serial data is received and repeated by the data repeating apparatus, from which it is sent out to the next station. When detecting the delimiter, this apparatus produces a delimiter timing signal. On the basis of this delimiter timing signal, a first conversion timing signal synchronized with the receiving clock is generated, while a second conversion timing signal synchronized with the sending clock is also generated. The receiving serial data is temporarily converted into parallel data by the first conversion timing signal, and then, this parallel data is re-converted into serial data by the second conversion timing signal. This serial data is sent out from the repeating station. Herein, a preamble portion (i.e., invalid-bit portion) is automatically formed on the basis of the maximum number of the drop-out bits corresponding to the number of the repeating stations linked together by the transmission line, so that this preamble portion is sent out with the re-converted serial data. When a period difference between the first and second conversion timing signals exceeds the predetermined allowable value, the bit-conversion size (e.g., 8 bits or 16 bits) is changed so as to avoid the bit-overflow phenomenon.

5 Claims, 13 Drawing Sheets

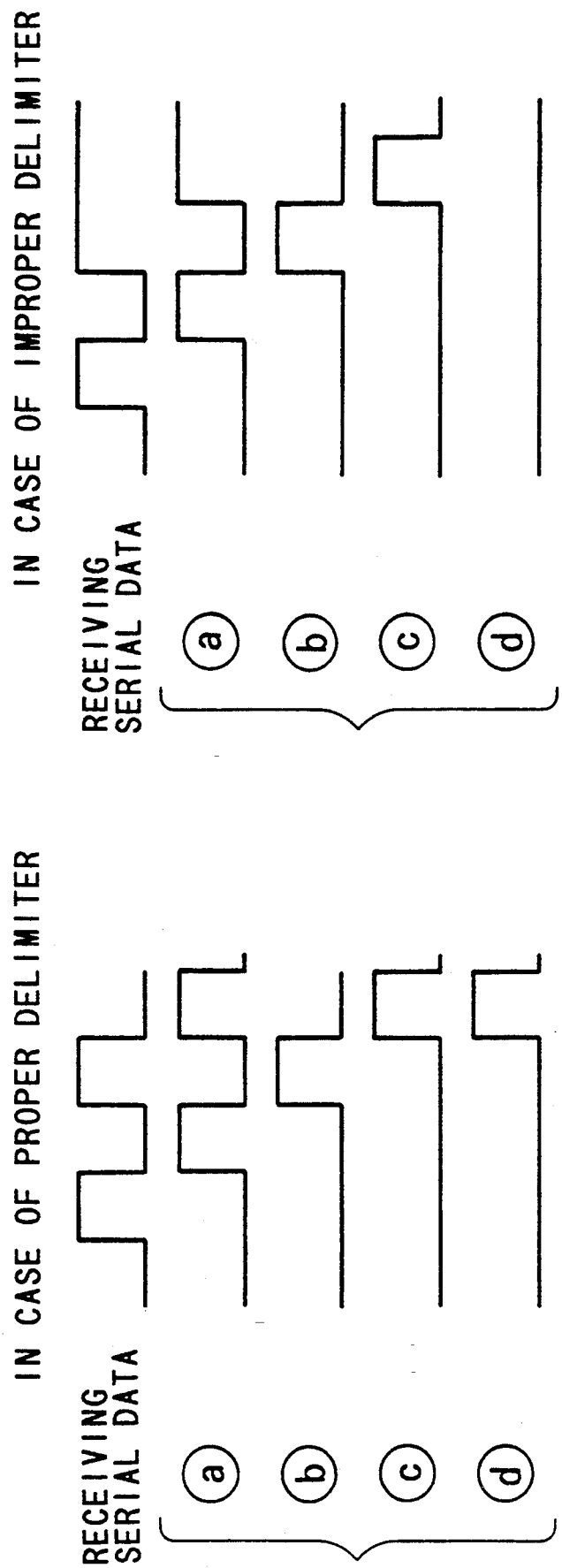

DATA REPEATING APPARATUS

BACKGROUND OF THE INVENTION

1. Field of the Invention

The present invention relates to a data repeating apparatus (or data transfer apparatus) which is applied to a local area network and the like wherein digital data sandwiched by delimiters are to be transferred.

2. Prior Art

In general, a local area network (i.e., LAN) can be defined as the communication network which is occupied by a single communication system. Herein, the data communication is performed in a bit-serial manner among the interdevices mutually linked together by the above network. There are two kinds of the LAN systems, i.e., the ring network and bus network.

In the ring network as shown in FIG. 1, plural terminals 72 are linked together in a ring by means of a transmission line 71. Herein, a signal sent from a certain terminal is reproduced by its adjacent terminal, and then it is repeated and transferred to the next terminal. Thus, this signal is sequentially transferred through some terminals, and finally it is returned back to the original terminal. Normally, all of the terminals are equally related to each other. Therefore, the transmission line 71 is commonly used by those terminals by the time-sharing control, which enables the data transfer between the certain terminals.

The serial data as shown in FIG. 2 is transferred in the above-mentioned ring network. This serial data normally contains a token and a frame. Herein, the token represents a right to access the transmission line, while the frame represents information to be transferred through the transmission line. In each of the token and frame, its significant data is sandwiched by delimiters 73 as Illustrated by the shadow portions in FIG. 2. This delimiter 73 is used for identifying the significant data, and it is embodied by the data consisting of two bits or more. Further, there is provided a preamble 74 between two data, wherein this preamble (i.e., invalid-bit portion) corresponding to the predetermined number of bits is eventually sandwiched by the delimiters. In the meantime, there are two methods how to access the token. According to one method, one terminal which picks up the token so as to receive the frame is now operating to collect the frame which circulates through the transmission line once and then returns back thereto, while this terminal simultaneously sends out the token to the transmission line. According to another method, the terminal releases and sends out the token to the transmission line Just after transferring the frame.

In the above-mentioned ring network, a specific station has a stabilized sending-clock generator activated by a crystal oscillator, while another repeating station directly uses the receiving clock as its sending clock. In other words, when observing this network with respect to the clock system, there is established a master-slave relationship. Such technique is disclosed in Japanese Patent Laid-Open Publication Nos. 58-150346 and 60-226249, for example.

However, when sending the data by use of the receiving clock, the number of the repeating stations must be limited in order to maintain a relatively high receiving-/sending precision, or a high-precision receiving/sending circuitry must be required for the repeating station in response to the number of the necessary repeating stations. In this case, it may be possible to convert the receiving data synchronized with the receiving clock into another data synchronized with the sending clock without changing the serial-data configuration of the receiving data as disclosed by U.S. Pat. No. 4,674,086 (see FIG. 10 of this patent). However, such data conversion leads the circuit configuration to be complicated.

The above-mentioned U.S. patent also discloses the conventional method how to extract the delimiter from the receiving serial data and then produce a delimiter timing signal. According to this method, the receiving serial data is once serially stored in the memory and the like, and then it is subjected to the data checking operation. For example, when the delimiter is four-bit data of which binary code is represented by "1010", as shown in FIG. 3, the receiving serial data is entered into a shift register 81, by which the bit pattern of the delimiter is detected by a decoder 82 so as to produce the delimiter timing signal.

The above-mentioned circuitry which produces the delimiter timing signal as shown in FIG. 3 has a relatively simple configuration. However, when the transfer rate of the serial data becomes high or the length of the delimiter becomes longer, the hardware configuration of this circuitry eventually becomes more complicated. Further, since the decoder contains the multi-input gate circuits such as the AND circuit and OR circuit and these circuits contains the delay elements, it is difficult to form the hardware of this circuitry which can perform the high-speed operations. If the terminal cannot perform the high-speed data processings, the period of time by which the data circulates through the transmission line once and then returns back to the original terminal must become longer, which deteriorates the performability of the network.

SUMMARY OF THE INVENTION

It is accordingly a primary object of the present invention to provide a data repeating apparatus which enables the multi-stage data repeating operations even if the precision of the receiving/sending circuitry of the repeating station is not relatively high.

It is another object of the present invention to provide a data repeating apparatus which can improve the usage efficiency of the transmission line provided between the terminal stations linked by the LAN.

Basically, the fundamental concept of the present invention is applied to the data repeating apparatus which receives, repeats and then transfers the serial data, sandwiched by the delimiters for identifying the significant data portion, by means of the transmission line of the LAN. More specifically, this data repeating apparatus according to the present invention contains a delimiter detecting circuit, a first conversion timing signal generator, a sending clock generator, a second conversion timing signal generator, a buffer circuit, a computing circuit and a preamble setting circuit. Herein, the delimiter detecting circuit extracts the delimiter from the receiving serial data synchronized with the receiving clock so as to produce a delimiter timing signal. Based on the delimiter timing signal, a first conversion timing signal synchronized with the receiving clock is generated. The sending clock generator generates the sending clock having the expected precision in the normal state. Based on the aforementioned delimiter timing signal, a second conversion timing signal synchronized with the sending clock is generated. The buffer circuit contains a serial/parallel converter and a parallel/serial converter. This serial/parallel converter converts the receiving serial data into the parallel data by the first conversion timing signal. Then, the parallel/serial converter which re-converts the parallel data into the serial data by the second conversion timing signal. The computing circuit measures the period of time by which the sending data circulates through the transmission line once and then returns back to the original station, thus computing the number of the repeating stations linked with the transmission line on the basis of the measured period of time. On the basis of the computed number of the repeating stations, the maximum number of bits which are dropped out from the data is computed. Then, the preamble portion is set corresponding to the computed maximum number of bits.

Instead of sending the data by the receiving clock, the present invention provides the specific sending clock generator in the repeating station. On the basis of the receiving serial data, the delimiter timing signal is generated, by which the first and second conversion timing signals respectively synchronized with the receiving clock and sending clock are generated. Then, the receiving serial data is temporarily converted into the parallel data by the first conversion timing signal. Thereafter, the parallel data is re-converted into the serial data by the second conversion timing signal, and consequently, this serial data is sent out from the repeating station. Thus, regardless of the number of the repeating stations, the certain precision of the receiving-/sending system is guaranteed against the upstream and downstream stations with respect to the repeating station. In other words, even if the precision of the receiving/sending system Is relatively low, the present invention can construct the data transmission system in which the multi-stage repeating operations can be performed. Moreover, the present invention optimizes the size of the preamble portion (i.e., invalid-bit data portion) which are provided to protect the significant data while computing the number of the repeating stations. Thus, as compared to the conventional system providing the preamble portion of which size is fixed at the relatively large size to incorporate the sufficient margin, the present invention can improve the efficiency of the data repeating operation.

According to another aspect of the present invention, a delimiter timing signal producing circuit corresponding to the foregoing delimiter detecting circuit comprises a start-timing signal producing portion, a delimiter producing portion and a comparator. Herein, the data-head portion of the delimiter is detected from the receiving serial data so as to produce the start-timing signal. Upon receipt of the start-timing signal, the delimiter is newly produced as the serial data. The receiving serial data is compared to the delimiter by every one bit so as to judge whether or not each binary digit of them coincide with each other, thus eventually producing the delimiter timing signal. Therefore, each of the binary digits of the receiving serial data is judged so as to produce the delimiter timing signal without temporarily and serially storing the receiving serial data. Thus, even if the data-transfer rate is relatively high, it is easy to construct the hardware of the circuitry while guaranteeing the high-speed performance of the data communication system as a whole.

BRIEF DESCRIPTION OF THE DRAWINGS

Further objects and advantages of the present invention will be apparent from the following description, reference being had to the accompanying drawings wherein the preferred embodiments of the present invention are clearly shown.

In the drawings:

FIGS. 16 and 17 show waveforms which are used for explaining operations of the circuitry shown In FIG. 14.

DESCRIPTION OF THE PREFERRED EMBODIMENTS

[A] First Embodiment

Figure 1:
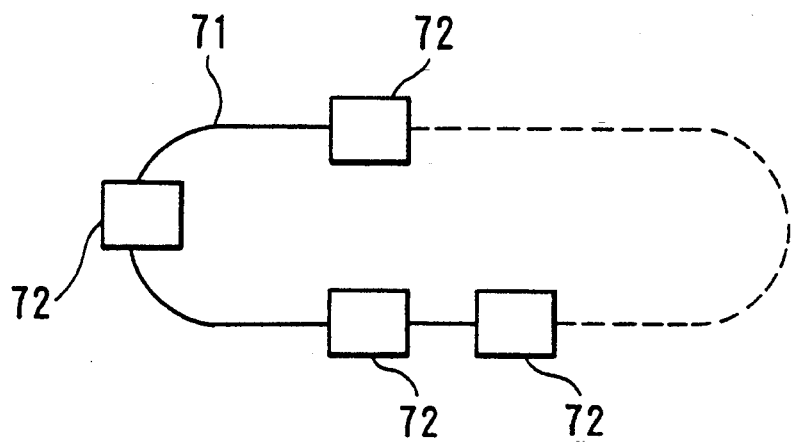
FIG. 1 is a drawing showing a diagrammatical configuration of the conventional ring network.
Figure 2:
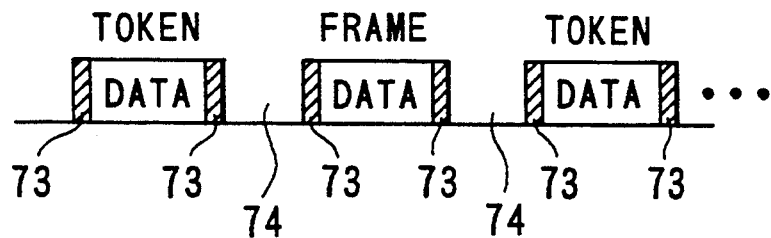
FIG. 2 is a drawing showing a configuration of data transmitted through the network.
Figure 3:
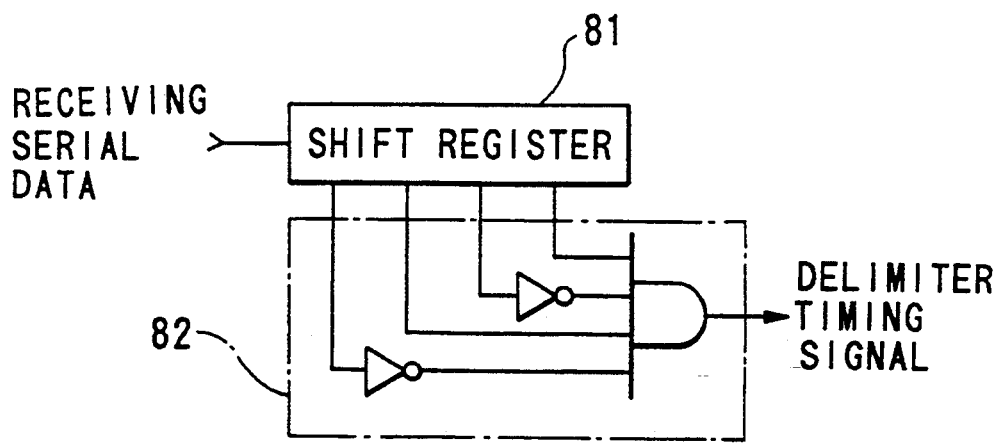
FIG. 3 is a block diagram showing the conventional circuitry which detects the timings of the delimiters contained in the receiving serial data.
Figure 4:
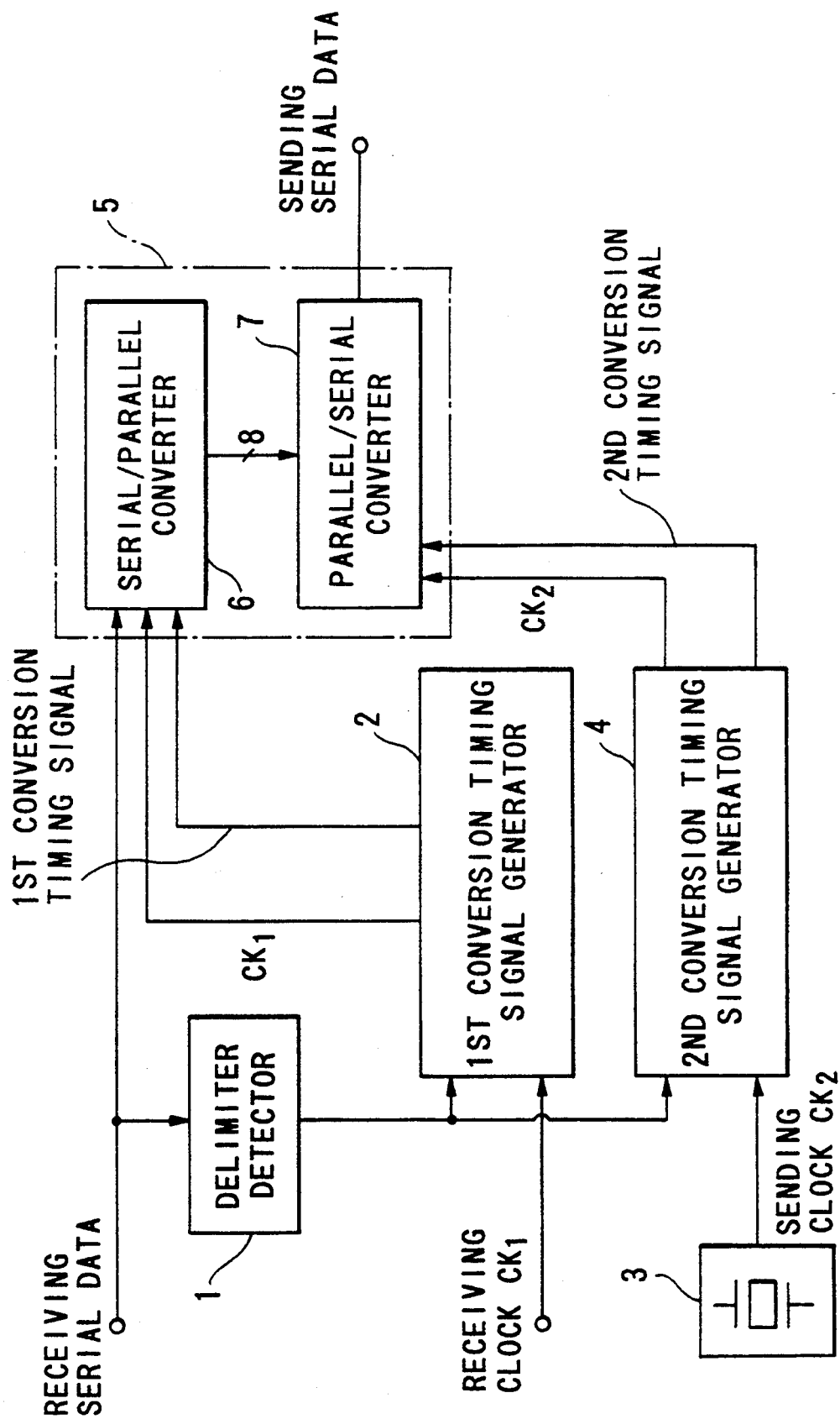
FIG. 4 is a block diagram showing an electronic configuration of a data repeating apparatus according to a first embodiment of the present Invention.

Now, the description will be given with respect to the data repeating apparatus according to the first embodiment of the present invention. FIG. 4 is a block diagram showing a main portion of this data repeating apparatus. This data repeating apparatus is configured by a delimiter detector 1, a first conversion timing signal generator 2, a sending clock generator 3, a second conversion timing signal generator 4 and a buffer circuit 5. Herein, the delimiter detector 1 detects the delimiter of the receiving serial data so as to produce a delimiter timing signal; the first conversion timing signal generator 2 generates a first conversion timing signal on the basis of the delimiter timing signal and a receiving clock signal CK1; the sending clock generator 3 generates a sending clock signal CK2 which is stabilized by the crystal oscillator having the expected precision in its normal operation; the second conversion timing signal generator 4 generates a second conversion timing signal on the basis of the delimiter timing signal and sending clock CK2; and the buffer circuit 5 initializes the receiving serial data by each frame and then sends them out.

The buffer circuit 5 contains a serial/parallel converter 6 and a parallel/serial converter 7. The serial/parallel converter 6 converts the receiving serial data into the parallel data by the unit of eight bits, while the parallel/serial converter 7 converts the parallel data into the serial data synchronized with the sending clock. This serial/parallel converter 6 is controlled by the first conversion timing signal given from the first conversion timing signal generator 2. In the concrete, the first conversion timing signal generator 2 is configured by a frequency divider which reduces the frequency of the receiving clock signal CK1 to the one eighth. On the other hand, the parallel/serial converter 7 is controlled by the second conversion timing signal given from the second conversion timing signal generator 4, and in the concrete, this second conversion timing signal generator 4 is configured by a frequency divider which reduces the frequency of the sending clock signal CK2, given from the sending clock generator 3, to the one eighth.

Figure 5:
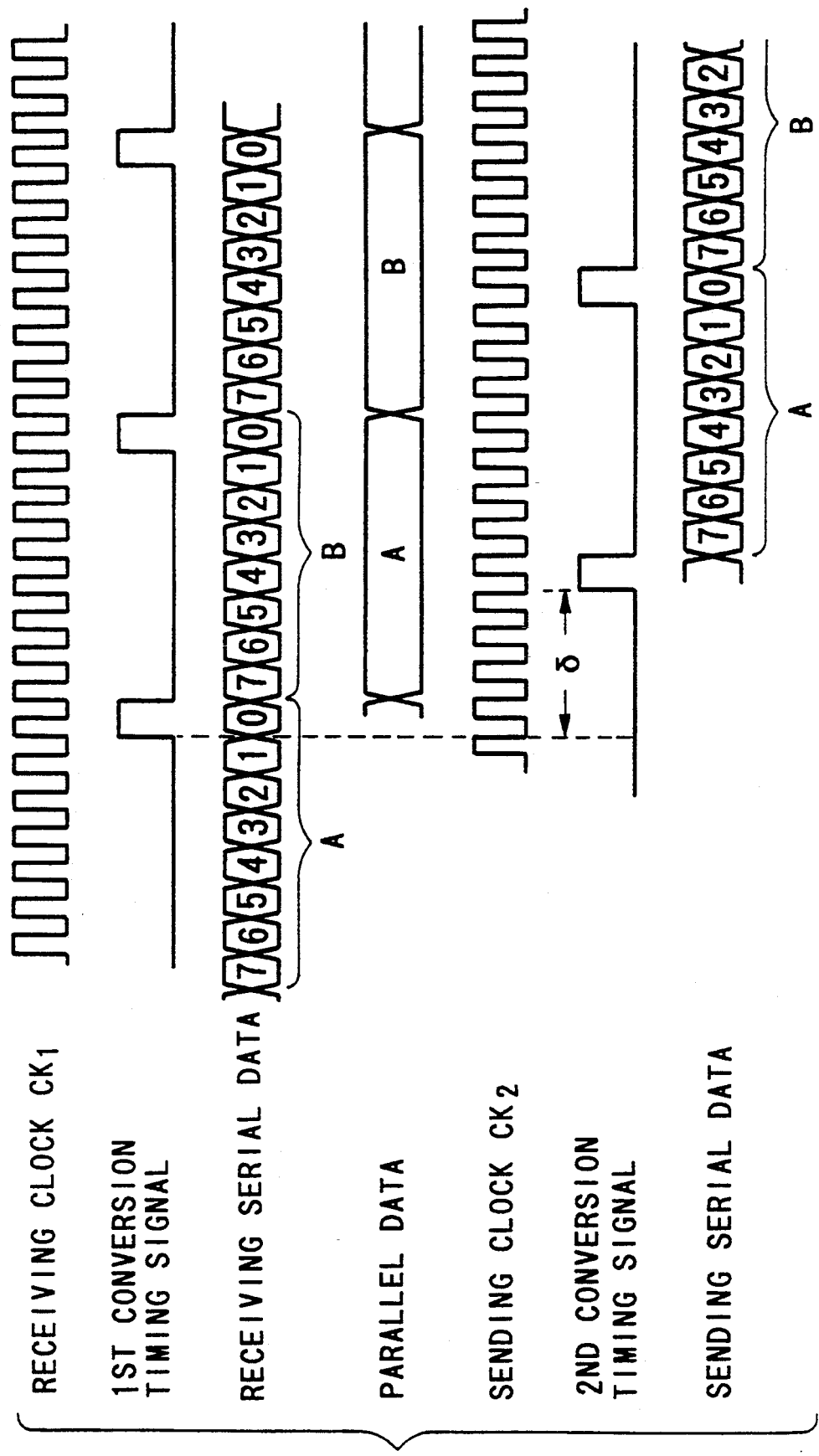
FIG. 5 shows the relationship among several signals in the circuitry shown in FIG. 4.

FIG. 5 shows the relationship between several signals used in the circuitry shown in FIG. 4. Ideally, the same periodicity should be applied to both of the first and second conversion timing signals. However, actually, there is provided a phase difference δ between these two signals. This phase difference δ can be obtained by providing the certain delay circuit (not shown in FIG. 4) within the second conversion timing signal generator 4, for example. It is preferable that the period corresponding to the phase difference δ is set identical to one half of the period of the first and second conversion timing signals. In this case, every time the delimiter is entered into the circuitry shown in FIG. 4, the phase difference can be canceled. For this reason, such phase shift between the first and second conversion timing signals which corresponds to their half period in each frame may be allowable, because it does not substantially affect the operations of the circuitry shown in FIG. 4.

As shown In FIG. 5, under effect of the first conversion timing signal having the one-eighth frequency of the receiving clock signal CK1, the receiving serial data is converted into the parallel data by the unit of eight bits. Thereafter, this parallel data is re-converted into the serial data by the second conversion timing signal having the one-eighth frequency of the sending clock signal CK2.

According to the present embodiment, the repeating station uses the characteristic sending clock. Therefore, as compared to the conventional system which directly uses the receiving clock as the sending clock, the deviation between the clock periods is prevented from being accumulated when transferring the data through several repeating stations.

Further, the cancellation of the phase shift between the clocks is performed by each frame. In other words, if the frame length is limited, the precision of the receiving/sending system can be computed. For example, in the case where the data length is set equal to 146 bytes and the transmission code is eight-bit data in the so-called transmission-code-differentiated Manchester format, the maximum allowable range of the phase difference δ between the first and second conversion timing signals can be calculated as follows:

8/146 (bytes)×8 (bits)×2=0.34 [%]

If the precision for the crystal oscillator is expressed by 100 [ppm], the maximum error between the receiving clock and sending clock in the present embodiment can be expressed by 200 [ppm] which equals to 0.02 [%]. Such small error is manageable.

As described before, the present embodiment performs the phase-shift cancellation every time the delimiter is detected. Therefore, if the number of the repeating stations is relatively many, there is a possibility in that the so-called bit drop-out event is occurred. In order to avoid such bit drop-out event, it is necessary to enlarge the foregoing preamble portion in the data string. However, when providing a relatively large preamble portion, the line-usage efficiency must become lower if the number of the repeating stations becomes smaller. In order to solve this problem, the present embodiment provides a means which automatically sets the optimum size for the preamble portion in response to the number of the repeating stations. Next, the detailed description will be given with respect to this means.

Figure 6:
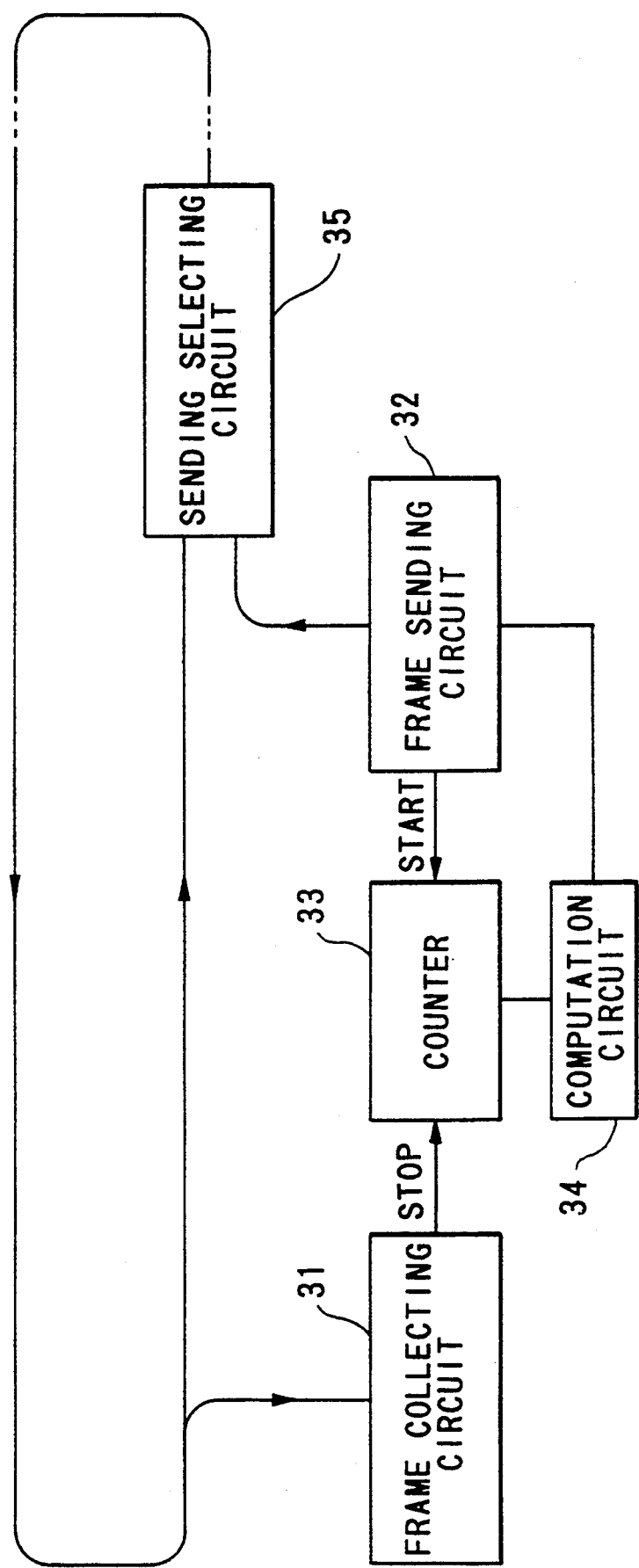
FIG. 6 is a block diagram showing a preamble setting portion of the data repeating apparatus.

FIG. 6 is a block diagram showing the circuitry, embodying the above-mentioned means, which optimizes the size of the preamble portion of the data string dealt by the data repeating apparatus according to the present embodiment. According to the known token-ring-type network, each repeating station obtains the foregoing right to access by collecting the token, and then the frame is sent out instead of the token, thereafter, the token is released out when the repeating station collects the frame which circulates through the transmission line once and then returns back thereto. In FIG. 6, a sending selecting circuit 35 is designed to replace the token with the frame. A frame collecting circuit 31 corresponds to the forgoing circuitry shown In FIG. 4. A counter 33 measures the period of time between a first time when a frame sending circuit 32 sends out the frame toward the transmission line and a second time when the frame which is transmitted through the transmission line once is collected by the frame collecting circuit 31. Based on the result of the measurement, a computation circuit 34 computes the number of the repeating stations which are linked together by the transmission line. Herein, the size of the preamble portion is computed to be matched with the maximum number of the drop-out bits or more. Such computed size of the preamble portion is designated for the frame sending circuit 32 so that the frame sending circuit 32 will send out the corresponding preamble portion.

Figure 7:
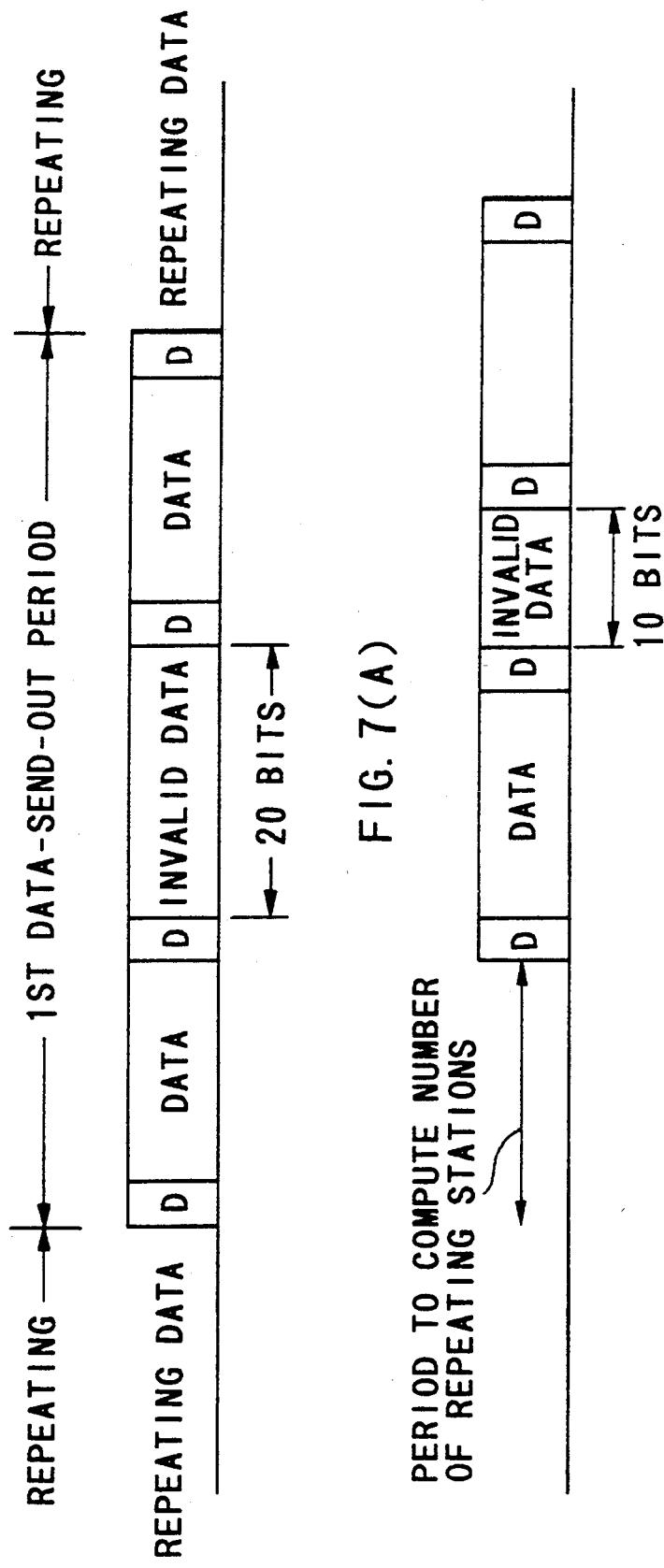
FIGS. 7(A), 7(B) are drawings each showing a configuration of the data which contains an invalid data portion as a preamble portion.

Next, the operation of setting the preamble portion in accordance with the present embodiment will be described by referring to FIGS. 7(A), 7(B), wherein "D" designates the delimiter. In FIG. 7(A), the number of bits of the preamble portion (i.e., invalid data) is set at "20" in order to provide a sufficient space between two data, for example. In this case, even if the number of the repeating stations is reduced so that only one bit is dropped out during the data transmission, it is possible to continuously send out 20-bit preamble portion. In contrast to FIG. 7(A), the present embodiment employs the data configuration as shown in FIG. 7(B) wherein there is provided a period to compute the number of the repeating stations. During this period, the actual number of the repeating stations are computed. If ten bits are dropped out during the data transmission, the present embodiment automatically forms and sends out 10-bit preamble portion.

According to the present embodiment, the number of bits of the preamble portion is reduced half from 20 bits to 10 bits, by which the line-usage efficiency can be improved.

Figure 8:
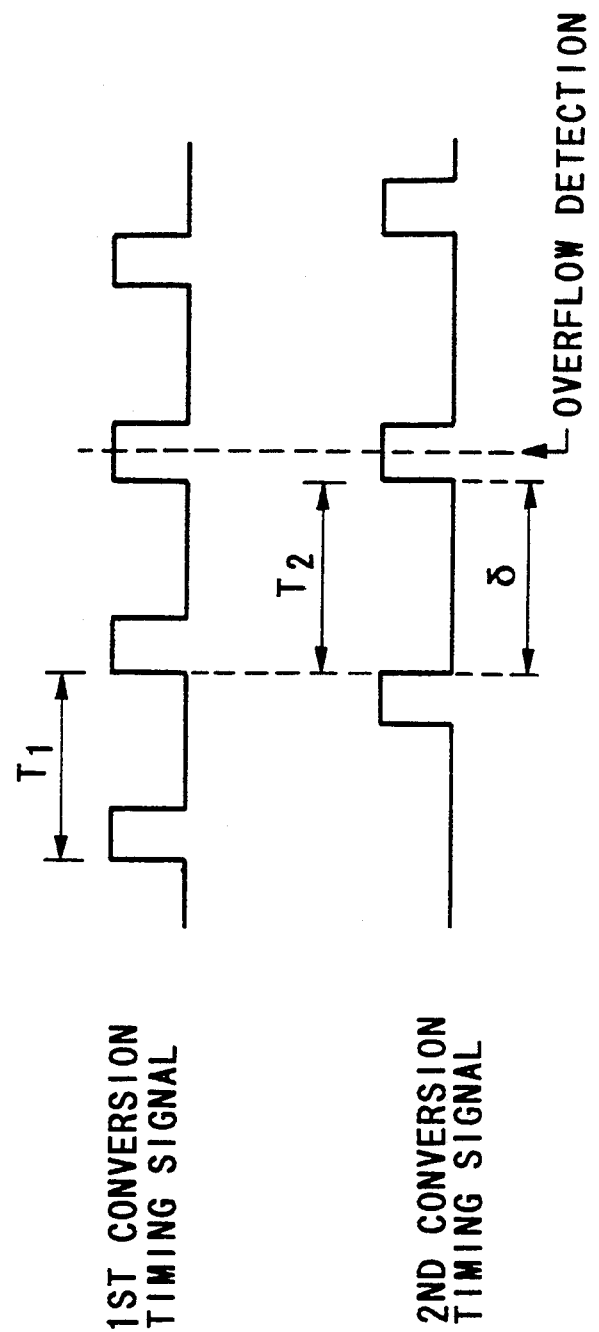
FIG. 8 shows the relationship between first and second conversion timing signals which are produced by the data repeating apparatus shown in FIG. 4.

In some cases, the frequency difference between the sending clock and receiving clock is relatively large and the frame length is also relatively large, so that the present embodiment (in which the serial/parallel conversion and parallel/serial conversion are performed by the unit of eight bits) cannot perform the phase-shift cancellation anymore. FIG. 8 shows the first and second conversion timing signals corresponding to the above-mentioned cases. Herein, the first and second conversion timing signals are pulse signals respectively having periods T1, T2. If the error between these periods T1, T2 is relatively large, such error is accumulated by each frame. When the phase difference δ (corresponding to the accumulated errors) becomes larger than the period T1 of the first conversion timing signal, the serial/parallel converter 6 in the buffer circuit is subjected to the overflow event so that the accurate sending data cannot be obtained. Such overflow event may be avoided by modifying the present embodiment such that the bit-conversion size of the serial/parallel conversion and parallel/serial conversion is controlled to be changed.

Figure 9:
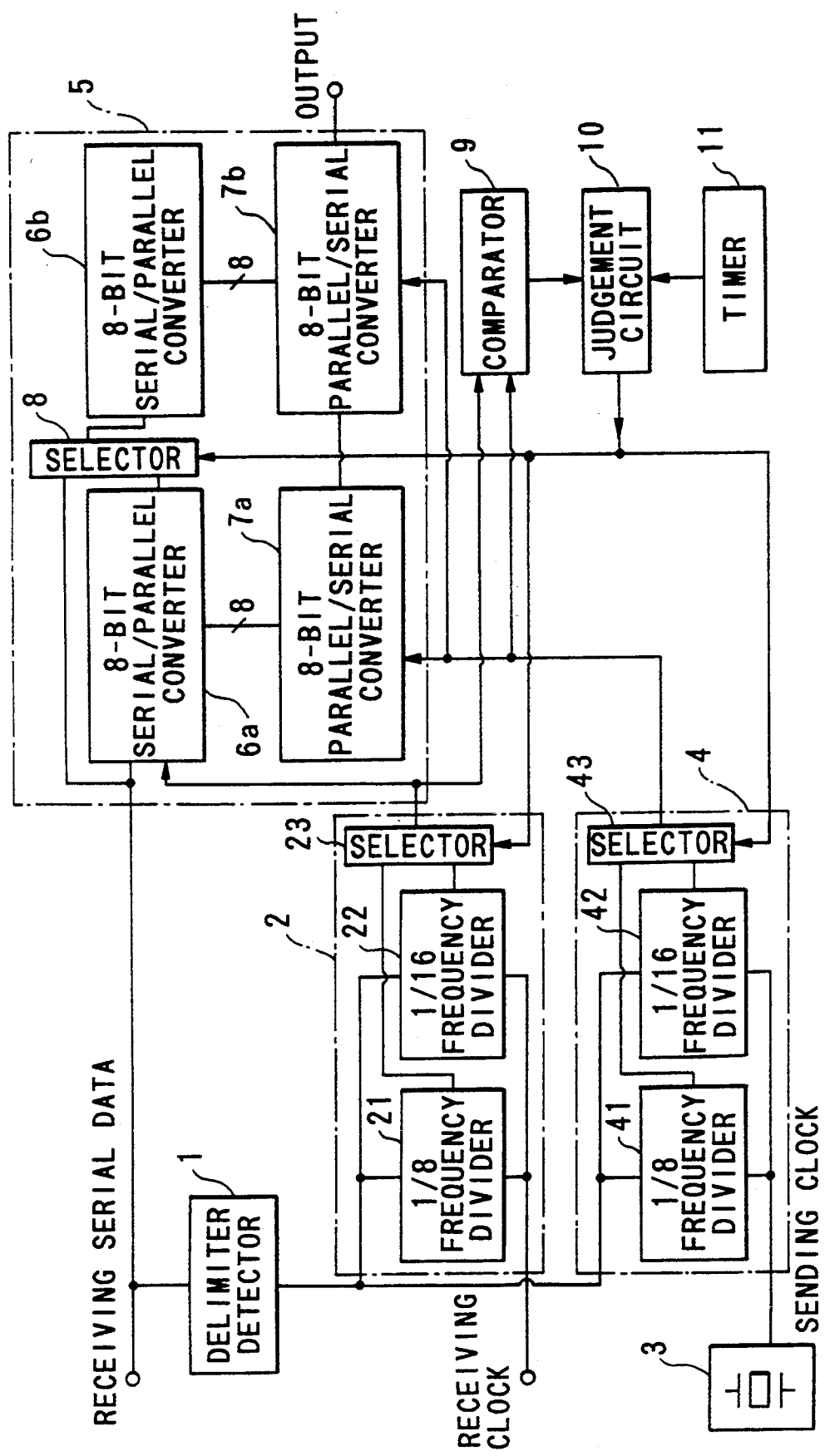
FIG. 9 is a block diagram showing a modified example of the first embodiment shown in FIG. 4.

FIG. 9 is a block diagram showing a modified example of the present embodiment, wherein the parts corresponding to those shown in FIG. 4 are designated by the same numerals. Herein, the first conversion timing signal generator 2 contains a ⅛ frequency divider 21, a 1/16 frequency divider 22 and a selector 23. This selector 23 selects one of the outputs of the frequency dividers 21, 22. Similarly, the second conversion timing signal generator 4 contains a ⅛ frequency divider 41, a 1/16 frequency divider 42 and a selector 43. This selector 43 selects one of the outputs of the frequency dividers 41, 42.

The buffer circuit 5 contains two 8-bit serial/parallel converters 6a, 6b and two 8-bit parallel/serial converters 7a, 7b. In addition, a selector 8 is provided to selectively connect or disconnect the 8-bit serial/parallel converters 6a, 6b. Herein, one of the 8-bit serial/parallel converters (e.g., 6b) is selectively used, or these are connected in series so as to form the 16-bit serial/parallel converter.

In order to control the above-mentioned selectors 23, 43 and 8, there are provided a comparator 9, a judgement circuit 10 and a timer 11.

In the normal state, the selector 23 selects the output of the ⅛ frequency divider 21; the selector 43 selects the output of the ⅛ frequency divider 41; and the selector 8 selects the 8-bit serial/parallel converter 6b so as to enter the receiving serial data into it. This state corresponds to the circuitry shown in FIG. 4.

When the 8-bit serial/parallel converter is subjected to the overflow event, the first and second conversion timing signals as shown in FIG. 8 are synchronized with each other without forming any phase difference, by which the comparator 9 detects such overflow event. Based on the result of the detection, the judgement circuit 10 switches over the selectors 23, 43, 8 respectively. Therefore, the 1/16 frequency dividers 22, 42 are respectively selected in the first and second conversion timing signal generators 2, 4, while the serial/parallel converters 6a, 6b are connected in series in the buffer circuit 5. Thus, the serial/parallel conversion and parallel/serial conversion will be performed by the unit of sixteen bits.

In the meantime, if the measurement of the timer 11 functions to detect an event in that the phase difference between the periods of the first and second conversion timing signals is smaller than the allowable value during the predetermined period of time, the selectors 8, 23, 43 are respectively activated so as to reduce the bit-conversion size of the serial/parallel conversion and parallel/serial conversion. In order to reduce the data transfer time, it is preferable to reduce the bit-conversion size of the serial/parallel conversion and parallel/serial conversion. The present embodiment is designed to cope with this matter. According to the present embodiment, in the normal state, even in the case where the frame length is relatively long and the phase shift between the sending clock and receiving clock is relatively large, the bit-conversion size is changed, thus enabling the foregoing phase-shift cancellation securely while maintaining the high-speed data transmission.

[B] Second Embodiment

Next, the description will be given with respect to a second embodiment of the present invention. This embodiment is characterized by the configuration and operation of the circuitry (i.e., delimiter detector shown in FIG. 4) which produces the delimiter timing signal in the data repeating apparatus.

Figure 10:
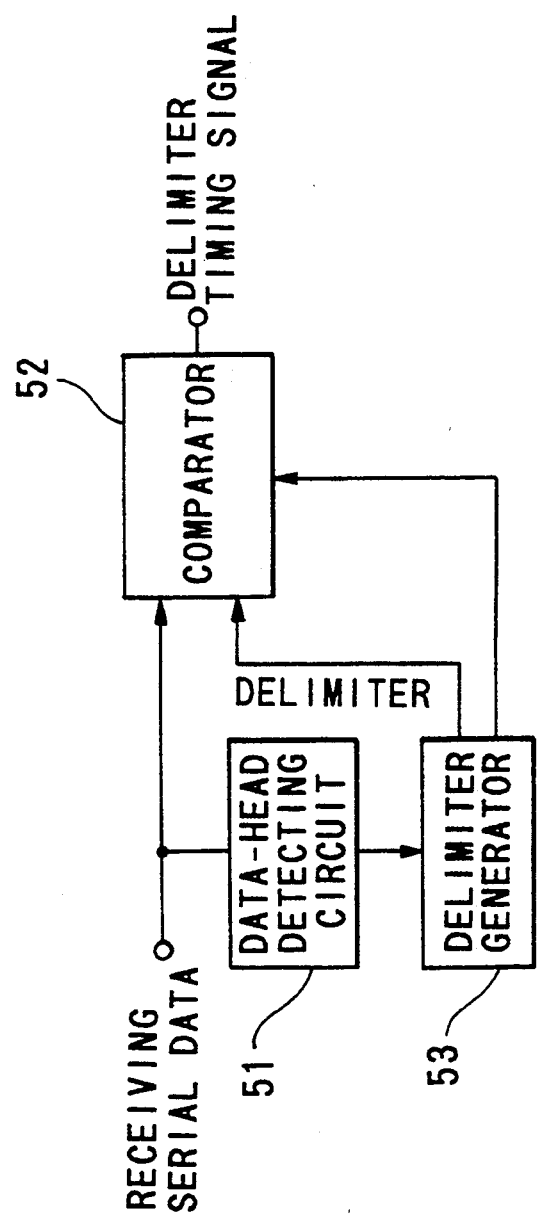
FIG. 10 is a block diagram showing a circuitry for producing a delimiter timing signal, which is applied to the data repeating apparatus according to a second embodiment of the present invention.

FIG. 10 shows the electronic configuration of this circuitry. Herein, 51 designates a data-head detecting circuit; 52 designates a comparator; and 53 designates a delimiter generator. The data-head detecting circuit 51 detects the head portion of the receiving serial data so as to produce a head detection signal (denoted as a start-timing signal). Upon receipt of the start-timing signal, the delimiter generator 53 serially produces the delimiters. The comparator compares the receiving serial data with the delimiter outputted from the delimiter generator 53 by every one bit in synchronism with the receiving clock, thus producing the delimiter timing signal.

Figure 11:
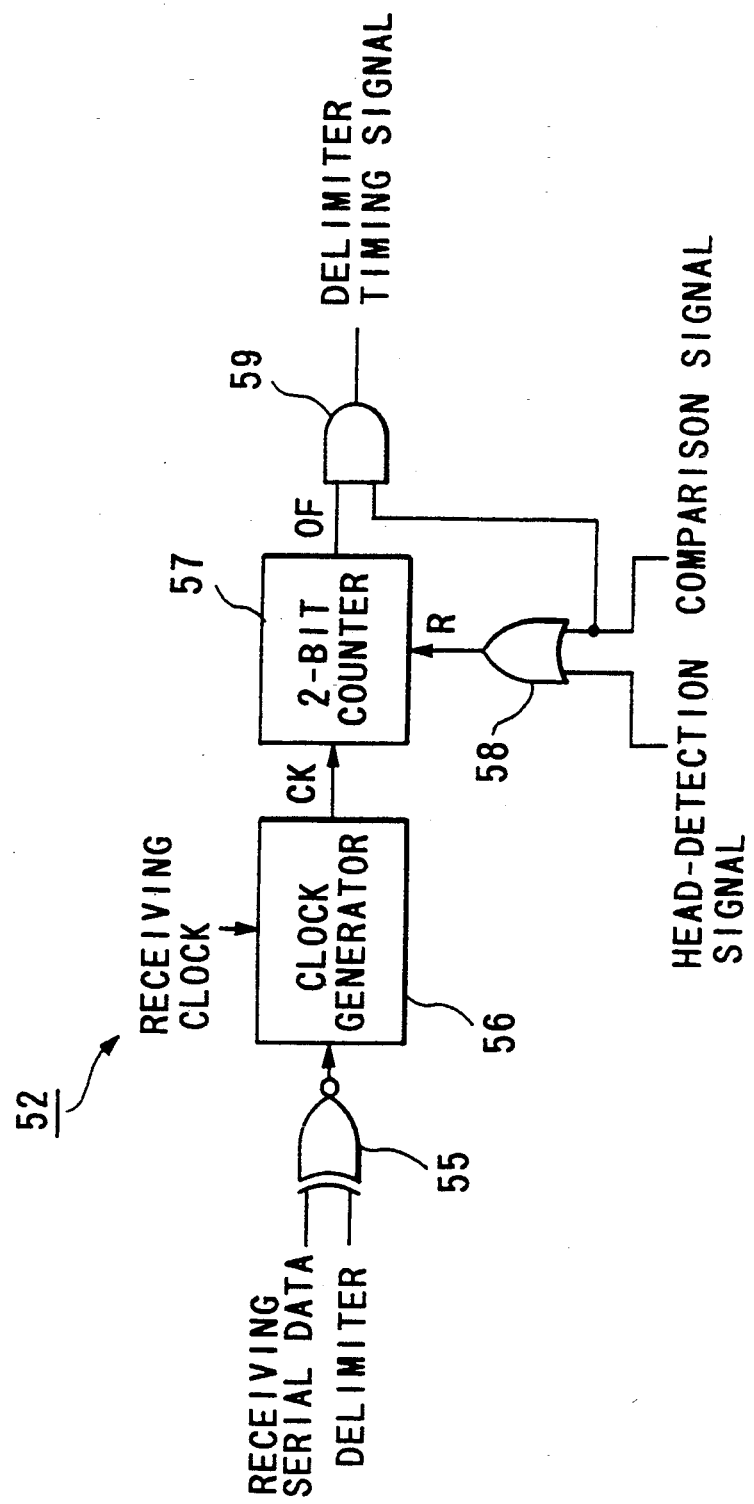
FIG. 11 is a block diagram showing a detailed configuration of a comparator shown in FIG. 10.

In the case where the delimiter is configured as the 4-bit data, the comparator 52 can be configured as shown in FIG. 11. Herein, an Exclusive-NOR gate 55 (hereinafter, referred to as EX-NOR gate 55) is provided to detect the coincidence or non-coincidence between two delimiters which are respectively given from the receiving serial data and delimiter generator 53. When these delimiters coincide with each other, the EX-NOR gate 55 outputs a "1" digit. Upon receipt of the "1" digit outputted from the EX-NOR gate 55, a clock generator 56 generates an internal clock (CK) in synchronism with the receiving clock. This internal clock is entered into a 2-bit counter 57. In the meantime, an OR gate 58 receives the head detection signal outputted from the data-head detecting circuit 51 and a comparison signal which is outputted from the delimiter generator 53 by every 4-bit timing of the receiving serial data. Then, an output of this OR gate 58 is supplied to the 2-bit counter 57 as a reset signal (R). Eventually, the 2-bit counter 57 outputs an overflow signal (OF). An AND gate 59 receives the overflow signal and comparison signal. When these two signals are at "1" level, the AND gate 59 outputs the delimiter timing signal.

Figure 12:
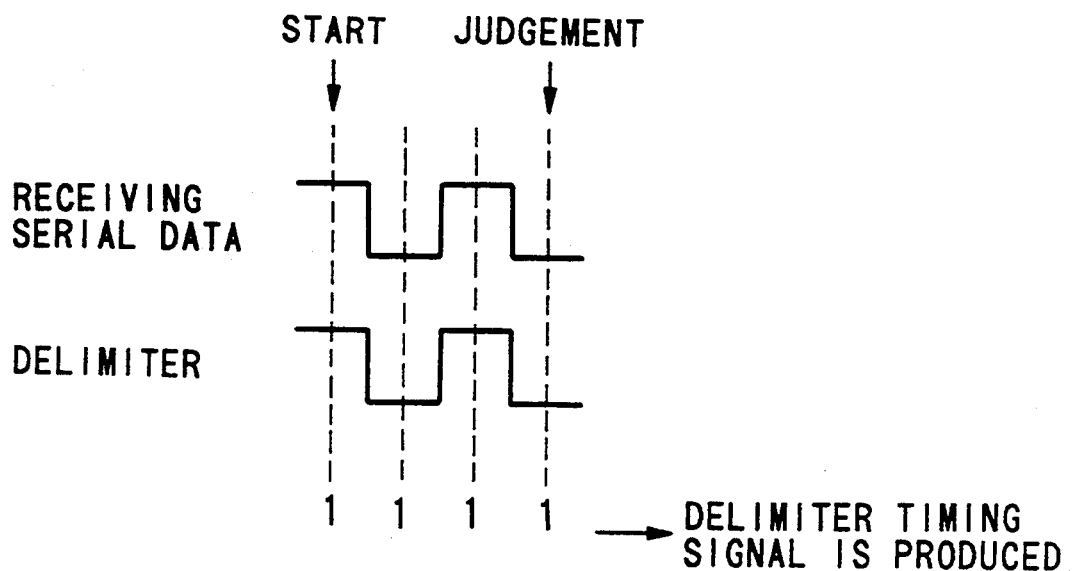
FIGS. 12 and 13 are diagrams for explaining operations of the comparator.
Figure 13:
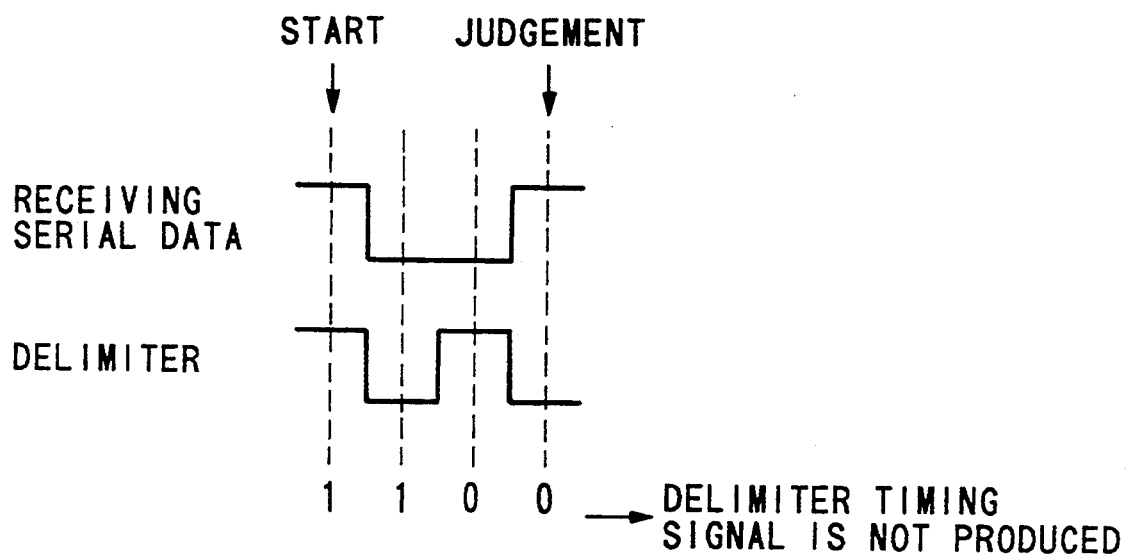

Next, the detailed description will be given with respect to the operation of the circuitry, as shown in FIGS. 10 and 11, which produces the delimiter timing signal by referring to FIGS. 12, 13. If the delimiter is denoted by the 4-bit data having the binary code "1010" so that the data-head detecting circuit 51 detects its first binary digit "1", the head detection signal (i.e., start-timing signal) is outputted. Responsive to this signal, the delimiter generator 53 serially outputs the delimiter having the binary code "1010" by the timings of the receiving clock. This delimiter is compared to the receiving serial data by every one bit. If first four bits of the delimiter completely coincide with those of the receiving serial data as shown in FIG. 12, the 2-bit counter 57 within the comparator 52 is subjected to the bit-overflow event so that the overflow signal is produced. On the basis of the product between the overflow signal and comparison signal, the delimiter timing signal is produced.

In the other cases where all of four bits of the delimiter do not completely coincide with those of the receiving serial data, the 2-bit counter 57 is reset by the head detection signal or the comparison signal which is produced by every four-bit timing, so that the overflow signal would not be outputted. Therefore, in the case as shown in FIG. 13, the delimiter timing signal is not produced.

According to the present embodiment, by merely comparing the receiving serial data with the delimiter by every one bit, it is possible to obtain the delimiter timing signal without temporarily and serially accumulating the receiving serial data. Therefore, the hardware configuration can be simplified, however, the high-speed performance of the system would not be damaged.

[C] Third Embodiment

Figure 14:
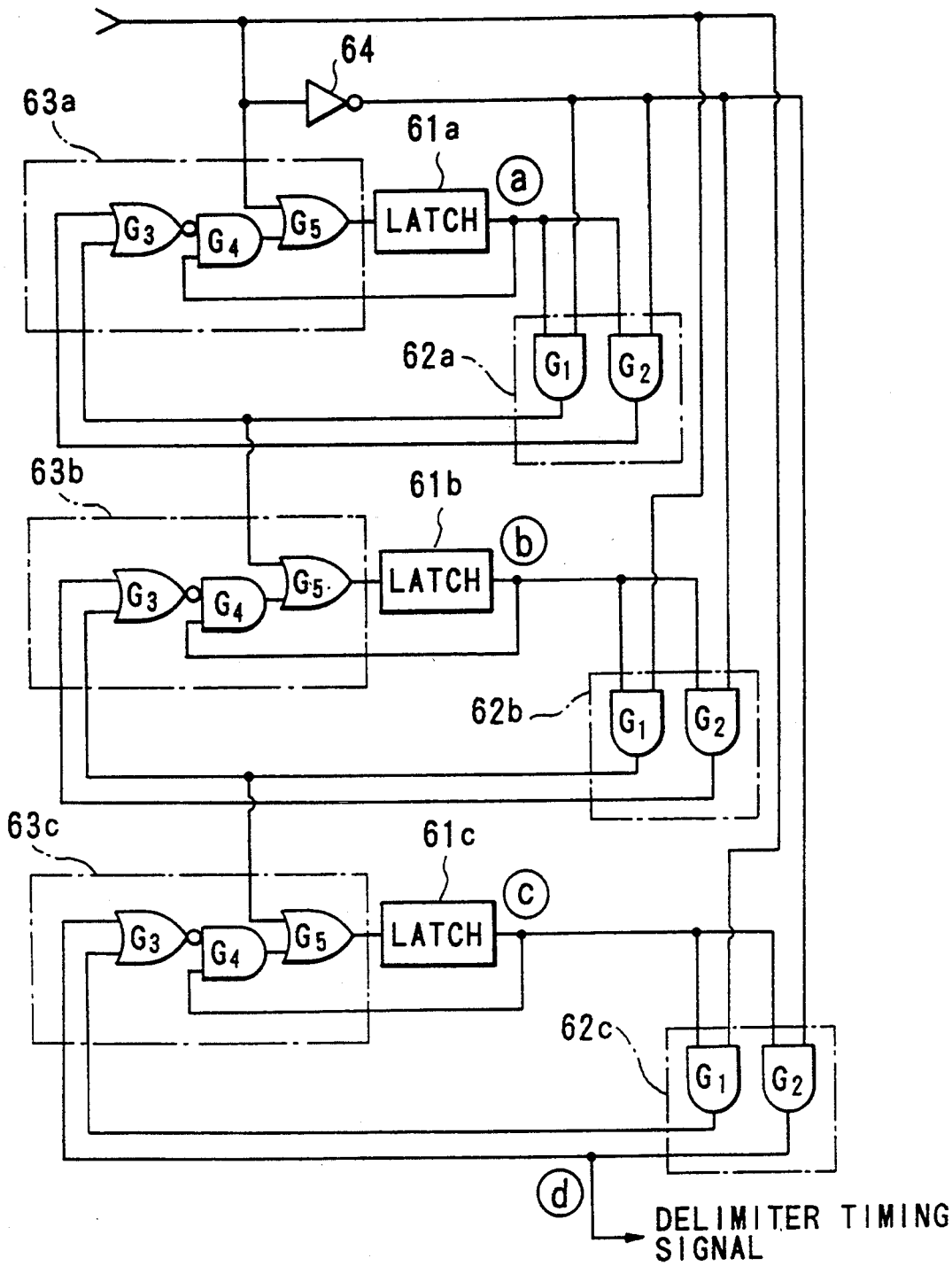
FIG. 14 is a block diagram showing another circuitry for producing the delimiter timing signal, which is applied to the data repeating apparatus according to a third embodiment of the present invention.

FIG. 14 shows a circuitry of producing the delimiter timing signal applied to the data repeating apparatus according to a third embodiment of the present invention. This embodiment also employs the 4-bit delimiter which is denoted by the binary code "1010", for example. In order to store the transition states of the bit patterns of the delimiter, this embodiment provides three latch circuits 61a, 61b, 61c. There are further provided three gate circuits 62a, 62b, 62c, each of which contains two AND gates G1, G2. These gate circuits are provided to detect the transition states of the bit patterns of the receiving serial data. More specifically, in the gate circuit 62a, each of the AND gates G1, G2 performs an AND operation on the output of the latch circuit 61a and an output of an inverter 64 which inverts the receiving serial data, thus judging whether or not these outputs coincides with each other. In the gate circuit 62b, the AND gate G1 performs the AND operation on the output of the latch circuit 61b and the receiving serial data, while another AND gate G2 performs the AND operation on the output of the latch circuit 61b and the output of the inverter 64, thus judging whether or not the output of the latch circuit 61b coincides with the receiving serial data or inverted receiving serial data. Similarly, under operation of the AND gates G1, G2 in the gate circuit 62c, it is Judged whether or not the output of the latch circuit 61c coincides with the receiving serial data or inverted receiving serial data. Furthermore, there are provided three write control circuits 63a, 63b, 63c, each of which contains a NOR gate G3, an AND gate G4 and an OR gate G5. Under the logical operations of the write control circuits 63a, 63b, 63c, the data writing operation, data rewriting operation or write prohibiting operation is selectively performed on the latch circuits 61a, 61b, 61c in response to the transition state of the receiving serial data.

Figure 15:
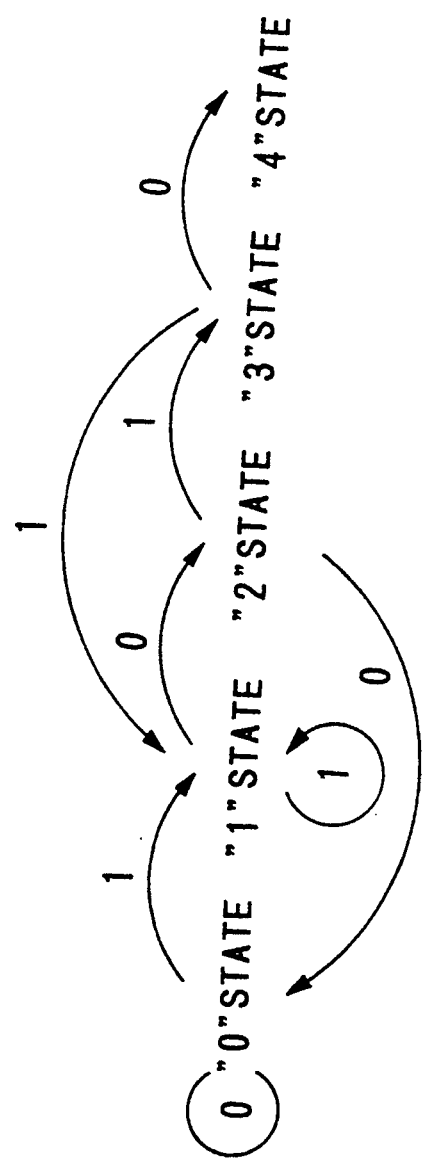
FIG. 15 shows transition states of the circuitry shown in FIG. 14.

Next, the description will be given with respect to the operation of the above-mentioned circuitry which functions to produce the delimiter timing signal by referring to FIGS. 15-17. FIG. 15 shows transition states represented by the latch circuits 61a-61c; FIG. 16 shows the waveforms of the signals by which the delimiter is properly detected, while FIG. 17 shows the other waveforms of the signals by which the delimiter is not properly detected.

The circuitry shown in FIG. 14 indicates one of the "0" state, "1" state, "2" state, "3" state and "4" state in response to the change of the delimiter, denoted by the binary code "1010", within the receiving serial data. In the "0" state, all of the latch circuits 61a-61c store the same value "0". Under this "0" state, when the first binary digit of the receiving serial data is at "1" and it is entered into this circuitry, this digit is transferred to the latch circuit 61a via the OR gate G5 of the write control circuit 63a. Thus, the state is changed to the "1" state. Then, when the second binary digit of the receiving serial data, denoted by "0", is entered, this digit is compared to the former digit-state at a node ⓐ so that the change of the digit is detected by the gate circuit 62a. Thus, the "1" digit stored in the latch circuit 61a is eventually transferred to another latch circuit 61b by means of the AND gate G1 of the gate circuit 62a and the OR gate G5 of the write control circuit 63b, so that the state is changed to the "2" state. At this time, the second binary digit "0" is written into the latch circuit 61a.

Next, when the third binary digit of the receiving serial data, denoted by "1", is entered, this digit is compared to the digit state at a node ⓑ so that the change of the digit is detected by the gate circuit 62b. Thus, the "1" digit stored in the latch circuit 61b is transferred to the latch circuit 61c by means of the AND gate G1 of the gate circuit 62b and the OR gate G5 of the write control circuit 63c. At this time, the "0" digit stored in the latch circuit 61a is transferred to the latch circuit 61b, while the above-mentioned third binary digit "1" is written into the latch circuit 61a.

Thereafter, when the fourth binary digit of the receiving serial data, denoted by "0", is entered, this digit is compared to the digit state at a node ⓒ so that the change of the digit is detected by the gate circuit 62c. At this time, the "1" digit emerged at the node ⓒ is supplied to the first input of the AND gate G2 of the gate circuit 62c, while the foregoing inverter 64 inverts the above-mentioned fourth digit "0" into the "1" digit which is supplied to the second input of the AND gate G2, and consequently, the output of the AND gate G2, i.e., "1" digit, is emerged at a node ⓓ. Thus, the delimiter timing signal having the "1" digit is outputted from this node ⓓ. This is the "4" state.

In contrast, when the continuous 4-bit pattern of the receiving serial data is not denoted by "1010", the stored data of the latch circuits 61a-61c are not changed as described above. For example, under the "0" state, when the binary digit "0" is entered, there is no change of the digit, so that the "0" state is held as it is. Under the "1" state where the "1" digit is previously stored In the latch circuit 61a, if the new binary digit "1" is entered, there is no change of the data stored in the latch circuit 61a. At this time, the "1" digit is emerged at the node ⓐ and the output of the inverter 64 is set at "0", so that both of the outputs of the AND gates G1, G2 in the gate circuit 62a are set at "0". Therefore, the "1" digit is not written into the latch circuit 61b. In short, the "1" state is maintained.

Under the "2" state where the latch circuit 61a retains the "0" digit and another latch circuit 61b retains the "1" digit, when the new binary digit "0" is entered, this digit is directly transferred to and retained in the latch circuit 61a, so that the state is changed back to the "0" state.

Under the "3" state, when the new binary digit "1" is entered, this digit is directly transferred to and retained in the latch circuit 61a, while the "0" digit is outputted from the AND gate G1 of the gate circuit 62a and it is transferred to the latch circuit 61b via the OR gate G5 of the write control circuit 63b. Thus, the state is changed to the former "1" state. FIG. 17 shows this case, in which the delimiter timing signal is not produced.

As described heretofore, only if the binary digits of the receiving serial data which are serially entered into this circuitry are changed as "1010", the "1" digit is transferred through the latch circuits 61a, 61b, 61c in turn so that this "1" digit is eventually emerged at the node ⓓ.

Even the present circuitry as shown in FIG. 14 can detect the transition states of the receiving serial data by every one bit so as to produce the delimiter timing signal without serially storing the receiving serial data. Thus, it is possible to reduce the time by which the data circulates through the ring network once, in other words, it is possible to achieve the high-speed data transfer in the communication network.

Lastly, this invention may be practiced or embodied in still other ways without departing from the spirit or essential character thereof as described heretofore. Therefore, the preferred embodiments described herein are illustrative and not restrictive, the scope of the invention being indicated by the appended claims and all variations which come within the meaning of the claims are intended to be embraced therein.

What is claimed is:

1. In a data repeating apparatus applied to a communication network system as a repeating station wherein serial data, received by the data repeating apparatus, contains a significant data portion bounded by delimiters in order to discriminate the significant data portion from within the serial data which is transferred by means of a transmission line, said data repeating apparatus comprising:
   a delimiter detecting means for extracting a delimiter from the received serial data, synchronized with a receiving clock so as to produce a delimiter timing signal;
   a first conversion timing signal generating means for generating a first conversion timing signal synchronized with the receiving clock on the basis of said delimiter timing signal;
   a sending clock generating means for generating a sending clock;
   a second conversion timing signal generating means for generating a second conversion timing signal synchronized with the sending clock on the basis of said delimiter timing signal;
   a serial/parallel converter means for converting said receiving serial data into parallel data by said first conversion timing signal; and
   a parallel/serial converter means for re-converting said parallel data into serial data by said second conversion timing signal,
   whereby the re-converted serial data is sent out from said repeating station as sending data.

2. In a data repeating apparatus applied to a communication network system as a repeating station wherein serial data, received by the data repeating apparatus, contains a significant data portion bounded by delimiters in order to discriminate the significant data portion from within the serial data which is transferred by means of a transmission line, said data repeating apparatus comprising:
   a delimiter detecting means for extracting a delimiter from the received serial data synchronized with a receiving clock so as to produce a delimiter timing signal;
   a first conversion timing signal generating means for generating a first conversion timing signal synchronized with the receiving clock on the basis of said delimiter timing signal;
   a sending clock generating means for generating a sending clock;
   a second conversion timing signal generating means for generating a second conversion timing signal synchronized with the sending clock on the basis of said delimiter timing signal;
   a serial/parallel converter means for converting said receiving serial data into parallel data by said first conversion timing signal;
   a parallel/serial converter means for re-converting said parallel data into serial data by said second conversion timing signal;
   a computing means for measuring a period of time in which a data frame circulates through the transmission line once and then returns back to the data repeating apparatus thus computing a number of repeating stations within the network system on the basis of the measured period of time; and
   a preamble setting means for computing a maximum number of bits which are removed from a data transmission on the basis of the computed number of repeating stations, thus setting a preamble portion corresponding to the computed maximum number of bits,
   whereby the re-converted serial data accompanied with said preamble portion is sent out from said repeating station as sending data.

3. In a data repeating apparatus applied to a communication network system as a repeating station wherein serial data, received by the data repeating apparatus, contains a significant data portion bounded by delimiters in order to discriminate the significant data portion from within the serial data which is transferred by means of a transmission line, said data repeating apparatus comprising:
   a delimiter detecting means for extracting a delimiter from the received serial data synchronized with a receiving clock so as to produce a delimiter timing signal;
   a first conversion timing signal generating means for generating a first conversion timing signal synchronized with the receiving clock on the basis of said delimiter timing signal;
   a sending clock generating means for generating a sending clock;
   a second conversion timing signal generating means for generating a second conversion timing signal synchronized with the sending clock on the basis of said delimiter timing signal;

a serial/parallel converter means for converting said receiving serial data into parallel data by said first conversion timing signal;

a parallel/serial converter means for re-converting said parallel data into serial data by said second conversion timing signal; and a control means for controlling said serial/parallel converter means and said parallel/serial converter means so as to change a bit-conversion size by which the serial/parallel conversion and the parallel/serial conversion are performed, whereby the re-converted serial data is sent out from said repeating station as sending data.

4. A data repeating apparatus as defined in claim 3 wherein said control means is activated so that the bit-conversion size is changed when a period error between said first and second conversion timing signals is larger than a predetermined allowable value.

5. A data repeating apparatus as defined in claim 3 wherein the bit-conversion size is changed from m bits to n bits (where n>m) when a period error between said first and second conversion timing signals is larger than a predetermined value.

* * * * *